(12) United States Patent
Reed

(10) Patent No.: US 8,719,144 B2
(45) Date of Patent: May 6, 2014

(54) EXCHANGE TRADING SYSTEM AND METHOD HAVING A VARIABLE MAKER-TAKER MODEL

(75) Inventor: David Dillingham Reed, St. Charles, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 149 days.

(21) Appl. No.: 12/883,048

(22) Filed: Sep. 15, 2010

(65) Prior Publication Data

US 2011/0071936 A1  Mar. 24, 2011

Related U.S. Application Data

(60) Provisional application No. 61/243,897, filed on Sep. 18, 2009.

(51) Int. Cl.
*G06Q 40/00* (2012.01)

(52) U.S. Cl.
USPC ............ 705/37; 705/36 R; 705/35; 705/44

(58) Field of Classification Search
USPC .................................................. 705/35–45
See application file for complete search history.

(56) References Cited

U.S. PATENT DOCUMENTS

| | | | |
|---|---|---|---|
| 6,236,972 B1 | 5/2001 | Shkedy | |
| 6,321,212 B1 | 11/2001 | Lange | |
| 6,882,985 B1 | 4/2005 | Kay et al. | |
| 7,246,093 B1 * | 7/2007 | Katz | ................. 705/37 |
| 2002/0099640 A1 | 7/2002 | Lange | |
| 2004/0088242 A1 * | 5/2004 | Ascher et al. | ................. 705/37 |
| 2007/0073608 A1 | 3/2007 | Garcia | |
| 2010/0082495 A1 * | 4/2010 | Lutnick et al. | ................. 705/80 |
| 2010/0191640 A1 * | 7/2010 | Tilly et al. | ................. 705/37 |

OTHER PUBLICATIONS

"Will High-Frequency Traders Be Obliged to Trade?", John Hintze, Jun. 21, 2010, Securities Technology Monitor.*
"Maker-Taker", *MarketsWiki*, last modified on Apr. 30, 2010, Obtained from the Internet on Sep. 15, 2010 at: http://www.marketswiki.com/mwiki/Maker-taker (1 page).
Mehta, Nina, "Options Maker-Taker Markets Gain Steam", *Traders Magazine*, dated Oct. 2007, Obtained from the Internet on Sep. 15, 2010 at: http://www.tradersmagazine.com/issues/20071004/2933-1.html (5 pages).
C2 Options Exchange, Incorporated Fees Schedule, dated Jun. 1, 2012 (7 pages).
CBOE Stock Exchange (CBSX) Fees Schedule, dated Jun. 1, 2012 (3 pages).

(Continued)

*Primary Examiner* — Hai Tran
(74) *Attorney, Agent, or Firm* — Brinks Gilson & Lione

(57) ABSTRACT

A method is described for providing one of a plurality of maker-taker pricing models to a system connected with the exchange system. The method includes the steps of an exchange server receiving from a first market participant of the exchange a marked order at the exchange connected to a database, the marked order marked with an indication of an expected rebate amount for trading orders; associating the marked order with an order from a second market participant of the exchange stored in a database configured to receive and store orders having varying rebate amounts according to the expected rebate amount; and executing the marked order according to the indication of an expected rebate amount. An exchange system for accessing at least one maker-taker pricing model for executing a trade on an exchange is also disclosed.

10 Claims, 1 Drawing Sheet

(56) References Cited

OTHER PUBLICATIONS

CFE Fee Schedule, dated May 23, 2012 (5 pages).
Chicago Board Options Exchange, Incorporated Fees Schedule, dated Jun. 1, 2012 (19 pages).
Hinze, John, Will high frequency traders be obliged to trade?, Jun. 21, 2010, Securities Industry News (4 pages).
International Securities Exchange Schedule of Fees, dated Jun. 1, 2012 (24 pages).
NYSE Amex Options Fee Schedule, dated Jun. 1, 2012 (12 pages).
Supplemental Amendment filed in U.S. Appl. No. 13/491,338, dated Jul. 29, 2013 (8 pages).
U.S. Appl. No. 13/491,338, filed Jun. 7, 2012, entitled "Methods and Systems for Trade Fee and Rebate Computation and Order Routing" (37 pages).

* cited by examiner

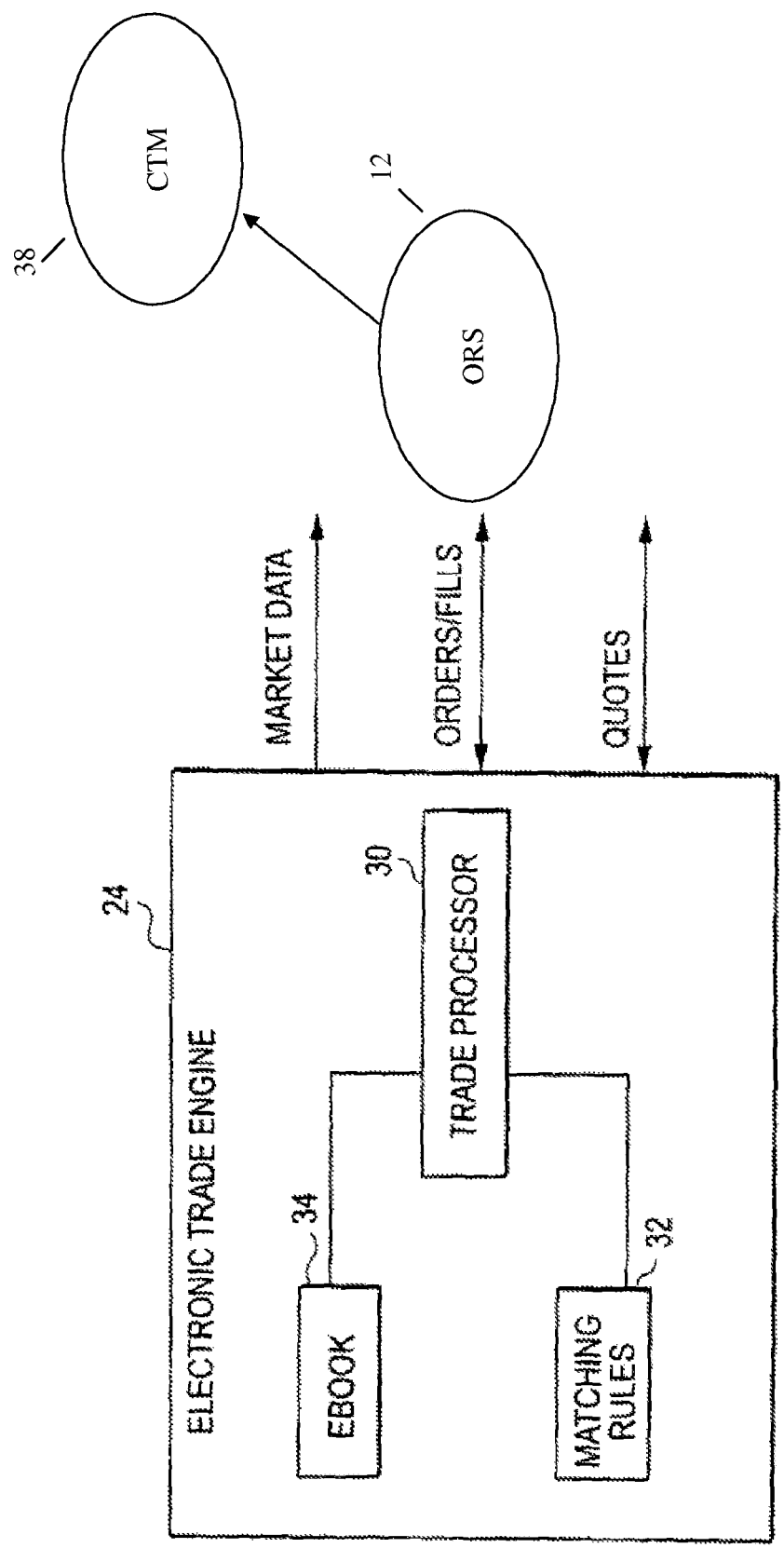

EXCHANGE TRADING SYSTEM AND METHOD HAVING A VARIABLE MAKER-TAKER MODEL

CROSS-REFERENCE TO RELATED APPLICATIONS

This application claims the benefit of U.S. Provisional Application No. 61/243,897, filed Sep. 18, 2009, the entirety of which is hereby incorporated herein by reference.

TECHNICAL FIELD

The present disclosure relates to the trading of securities or derivatives, such as stock, options or futures.

BACKGROUND

The introduction of electronic trading mechanisms into exchanges for securities and derivatives has been steady and relentless. The desire for immediacy of order execution and dissemination of information is one reason for the steady switch to electronic mechanisms. The simple fact that trading volume is growing, with the accompanying need for an increasingly efficient trading environment, also favors the move toward electronic trading mechanisms.

Traditional open outcry exchanges, however, can supply greater liquidity than electronic exchanges. One reason for this is the very efficiency that electronic mechanisms bring to an exchange. The speed with which trading takes place can adversely affect market makers by exposing them to unwanted risk. For example, if movement in the underlying security needs to be reflected in the options market, rapid response times are necessary. Communication delays can prevent market makers and others from changing their quotes or orders fast enough to reflect market conditions, thereby leading to smaller quote sizes to reduce the risk. Also, the price improvement capabilities of an open outcry exchange may be greater than an all-electronic exchange because floor brokers and market makers can handle large and complex orders face-to-face. Regardless of which type of exchange, whether the exchange uses one trading format alone or both formats in some combination, there can be challenges an exchange must face to attract and retain participants.

An exchange system and method that allows for efficient and transparent dissemination of the exact transaction costs to those market participants that remove liquidity ("taker"), and allows liquidity providing market participants ("maker") the ability to choose the rate at which their liquidity is needed.

SUMMARY

In order to address the need for attracting and maintaining participants, and thus attracting more order flow, a system and method for modifying a maker-taker pricing model is disclosed. The system and method may be implemented in a number of different exchange environments, such as all-electronic trading formats, or a trading platform combining electronic and open outcry formats that can provide efficient and instantaneous electronic executions at the national best bid or offer (NBBO) along with the opportunity for price improvement.

According to an embodiment, a method of providing one of a plurality of maker-taker pricing models a system connected to an exchange is disclosed. The method includes an exchange server receiving from a first market participant of the exchange a marked order at the exchange connected to a database, the marked order marked with an indication of an expected rebate amount for trading orders; associating the marked order with an order from a second market participant of the exchange stored in a database configured to receive and store orders having varying rebate amounts according to the expected rebate amount; and executing the marked order based on the indication of an expected rebate amount.

According to another embodiment, an exchange system for accessing at least one maker-taker pricing model for executing a trade on an exchange is disclosed. The exchange system comprises an electronic trade engine for receiving at least one a marked order marked with an indication of an expected rebate amount for trading orders; an electronic book contained in the electronic trade engine configured to receive and store orders having varying rebate amounts; a trade processor contained in the electronic trade engine associating the marked order to an order from a second market participant of the exchange stored in the electronic book according to the expected rebate amount; and the electronic trade engine executing a trade for the marked order based on the indication of an expected rebate amount.

BRIEF DESCRIPTION OF THE DRAWINGS

FIG. 1 is a block diagram of an electronic trading engine.

DETAILED DESCRIPTION

Exchange pricing models vary greatly, and exchange price competition extends beyond simply comparing the spread between maker/taker. By managing the expectations of its largest participants, an exchange can be maximized for transactions by adjusting the maker/taker pricing model along a scale, for example, between no cost and $0.0030.

Whatever the decided rates, an exchange must currently maximize transaction fee revenue based on the requirements of their biggest, most active, or most profitable participants. The present disclosure of a Variable Maker-Taker Model attempts to mitigate the negative effects of having a fixed-pricing system.

From the market participant's viewpoint, if one desires to provide liquidity for free (believing that the low "take" rate entices and attracts greater order flow and reduces the risk of adverse selection), such a participant must route its orders to the exchange that has maximized for transactions with a similar pricing structure to the desired rebate. Conversely, a market participant intending to collect as high a rebate possible, must select the destination exchange priced accordingly. If an exchange utilized a variable-rate model, where the liquidity provider has equally complete control over the rebate desired as the "taker" does in identifying and calculating the cost to remove liquidity (within the limits of the exchange's fee structure and regulatory limits), the exchange will attract and serve both described users simultaneously, regardless of their preference towards pricing.

Allowing variable maker-taker rates through a highly transparent real-time mechanism, like an exchange's internal book-feeds, will expand the use of an already important feature of the marketplace. Given the current sophistication of order routers with respect to calculating cost and speed when ranking its preferred destinations, an exchange operating a variable-rate maker-taker model would achieve greater efficiencies for market participants who place significant emphasis on cost.

The method and system disclosed herein provide an ideal solution for market participants. For example, an exchange such as the CBOE Stock Exchange ("CBSX") has much of the required infrastructure in place, including but not limited to a data center with redundancy, market data feeds, and connectivity to all other exchanges and major sources of liquidity. An exchange such as CBSX can extend this infrastructure by hosting a trade engine with trading algorithms in its data center.

The exchange would generally operate, in terms of order matching, crossing, routing and the like, as it does today. Interest to buy or sell may be ranked according to price/time priority and any allowable participant priority function that has been enabled. The exchange would disseminate an internal book-depth and top-of-book feed, as well as through the consolidated quote feeds. Market participants sending order would indicate on each order sent, using a specialized FIX tag or CMI field, the rebate they intend to receive if their order transacts as the "maker." Acceptable rates would be, for example, between $0.0000 and the standard "maker" rate.

Example 1

Order 1

Side—Buy
Symbol—XYZ
Price—$10.00
Quantity—1000 shares
"maker" Rebate—$0.0015

Order 2

Side—Sell
Symbol—XYZ
Price—$10.05
Quantity—500 shares
"maker" Rebate—$0.0025

In addition to the information currently contained within the internal book-depth and top-of-book feeds (bid price, ask price, bid size and ask size), the exchange makes available "bid rate" and "ask rate" data for each price point. The "bid rate" represents the transaction-fee cost, charged to a market participant removing liquidity by selling. The "ask rate" represents the transaction-fee cost, charged to a market participant when removing liquidity by buying. When the book contains multiple orders at a single price, the rates would reflect the volume-weighted average of the quantity displayed at each price.

The rates disseminated through the internal book feeds for each price, will represent the "booked" orders defined rate plus "x" ("TF spread"), or the default "taker" rate according to the exchange's fee schedule.

After receiving the example orders above, the internal book-feed reflects the following, assuming a $0.0005 TF spread:

Example 2

Buy—1000@10.00 TF=0.0020
Sell—500@10.05 TF=0.0030

If a new order were received that matches with Order 1, the market participant who routed Order 1 would receive a liquidity rebate of $0.0015 (same rebate as indicated on the order). The contra-party to the transaction would be charged a fee to remove liquidity of $0.0020 (same cost as displayed through the internal quote feed).

Example 3

Order 3

Side—Sell
Symbol—XYZ
Price—$10.00
Quantity—1000 shares
Order 1 & Order 3 Trade 1000 shares @$10.00
Order 1 receives a "maker" rebate of $0.0015
Order 3 is charged a "taker" fee of $0.0020

The exchange would deliver through existing Financial Information Exchange (FIX) and CBOE Market Interface (CMI) "billing code", the exact per-share fee or rebate billed for each execution.

Additionally, the exchange could change the limit order book priority method, to include the "take rate" when ranking orders received at the same price, putting preference on "total cost" (Order price+take rate) over time of receipt. The combination of both price/time and "total cost" priority would be a more effective and efficient overall price competition.

As illustrated in FIG. 1, the electronic trade engine 24 contains a trade processor 30 that analyzes and manipulates orders according to matching rules 32 stored in the database in communication with the trade processor. Also included in the electronic trade engine is the electronic book (EBOOK) 34, a database of orders and quotes, with which incoming orders to buy or sell are matched with quotes and orders resting on the EBOOK 34 according to the matching rules 32. The electronic trade engine 24 may be a stand-alone or distributed computer system. Any of a number of hardware and software combinations configured to execute the trading methods described below may be used for the electronic trade engine 24. In one embodiment, the electronic trade engine 24 may be a server cluster consisting of servers available from Sun Microsystems, Inc., Fujitsu Ltd. or other known computer equipment manufacturers. The EBOOK 34 portion of the electronic trade engine 24 may be implemented with Oracle database software and may reside on one or more of the servers comprising the electronic trade engine 24. The rules database 32 may be C++ or java-based programming accessible by, or executable by, the trade processor 30.

When a trade is completed, for example, automatically executed through the electronic trade engine 24, the fill information is sent through the electronic trade engine 24 and order routing system (ORS) 12. ORS 12 passes the fill information to the member firm systems and to a continuous trade match (CTM) system 38 which matches the buy side and sell side of a trade which, in turn, forwards the matched trades to a third party organization that will verify that all trades properly clear. The electronic trade engine 24 also sends quote and sale update information through an internal distribution system that will refresh display screens within the exchange and format the information for submission to a quote dissemination service such as the Options Price Reporting Authority (OPRA).

While various embodiments described, it will be apparent to those of ordinary skill in the art that many more embodiments and implementations are possible within the scope of the invention. Accordingly, the invention is not to be restricted except in light of the attached claims and their equivalents.

What is claimed is:

1. A computer implemented method of providing one of a plurality of maker-taker pricing models to a system connected with an exchange, comprising the steps of:
   receiving, by an exchange server, an order message at the exchange from a first market participant of the exchange, the order message containing an order to buy or sell a tradeable product and a rebate field, wherein the rebate field is populated with a numerical rebate rate;
   associating, by the exchange server, the order message with an order from a second market participant of the exchange stored in a database configured to receive and store orders having varying rebate rates according to received order properties, including the numerical rebate rate; and
   executing, by the exchange server, the order based on the received order properties, including the numerical rebate rate.

2. The method according to claim 1, wherein a first order message includes a different numerical rebate rate than a second order message.

3. The method according to claim 1, wherein the marked order is aggregated and crossed with other orders received from the first market participant.

4. An exchange system for accessing at least one maker-taker pricing model for executing a trade on an exchange, comprising:
   an electronic trade engine configured to receive at least one order message containing an order to buy or sell a tradeable product and a rebate field, the rebate field populated with a numerical rebate rate for trading orders;
   an electronic book contained in the electronic trade engine, the electronic book configured to receive and store orders having varying numerical rebate rates; and
   a trade processor contained in the electronic trade engine, the trade processor configured to associate an order in the order message with an order from a market participant of the exchange stored in the electronic book according to received order properties, including the numerical rebate rate;
   wherein the electronic trade engine is configured to execute a trade for the order based on the received order properties, including the numerical rebate rate.

5. The exchange system according to claim 4, wherein the electronic book comprises stored orders ranked in priority order according to the varying numerical rebate rates, wherein orders for tradeable products having a same order price are ranked by a cost that includes a cost added by respective numerical rebate rate associated with each order.

6. The exchange system according to claim 5, wherein the trade processor is configured to associate the order in the received order message to the order from the second market participant stored in the electronic book according to the rebate rate.

7. The method according to claim 1, wherein the numerical rebate rate is a rebate rate selected by the market participant between $0.00 and a standard maker rate for the exchange.

8. The method according to claim 1, wherein the received order properties include at least one of a price, a time of receipt, or a quantity.

9. The exchange system according to claim 4, wherein the numerical rebate rate is a rebate rate selected by the market participant between $0.00 and a standard maker rate for the exchange.

10. The exchange system according to claim 4, wherein the received order properties include at least one of a price, a time of receipt, or a quantity.

* * * * *

UNITED STATES PATENT AND TRADEMARK OFFICE
CERTIFICATE OF CORRECTION

| | | |
|---|---|---|
| PATENT NO. | : 8,719,144 B2 | Page 1 of 1 |
| APPLICATION NO. | : 12/883048 | |
| DATED | : May 6, 2014 | |
| INVENTOR(S) | : David Dillingham Reed | |

It is certified that error appears in the above-identified patent and that said Letters Patent is hereby corrected as shown below:

<u>In the Claims</u>

In column 5, claim 3, line 22, after "claim 1, wherein the" delete "marked".

Signed and Sealed this
Twenty-third Day of September, 2014

Michelle K. Lee
*Deputy Director of the United States Patent and Trademark Office*